US006751736B1

(12) United States Patent
Bowman et al.

(10) Patent No.: US 6,751,736 B1
(45) Date of Patent: Jun. 15, 2004

(54) METHOD AND APPARATUS FOR E-COMMERCE BY USING OPTIONAL FIELDS FOR VIRTUAL BAR CODES

(75) Inventors: Mark T. Bowman, Boca Raton, FL (US); Leslie P. Hauck, Parkland, FL (US); Christopher J. Monahan, Boca Raton, FL (US); Mary L. Monahan, Boca Raton, FL (US); Victor S. Moore, Boynton Beach, FL (US); Keith Morea, Boca Raton, FL (US); Emily J. Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/524,876

(22) Filed: Mar. 14, 2000

(51) Int. Cl.[7] .............................. G06F 11/30; H04L 9/00
(52) U.S. Cl. ........................ 713/189; 713/187; 713/176
(58) Field of Search ................. 380/28, 42; 705/76–78; 713/176, 187, 189

(56) References Cited

U.S. PATENT DOCUMENTS 5,483,598 A * 1/1996 Kaufman et al. ............. 380/43
5,715,314 A   2/1998 Payne et al.
5,991,878 A * 11/1999 McDonough et al. ....... 713/200
6,374,359 B1 * 4/2002 Shrader et al. ............. 713/201

FOREIGN PATENT DOCUMENTS

WO    WO 01/15035 A2    3/2001

OTHER PUBLICATIONS

UK Patent Search Report dated Nov. 27, 2001.

* cited by examiner

*Primary Examiner*—Gregory Morse
*Assistant Examiner*—Jacob Lipman
(74) *Attorney, Agent, or Firm*—Richard A. Tomlin; Jon A. Gibbons; Fleit, Kain, Gibbons, Gutman, Bongini & Bianco P.L.

(57) ABSTRACT

E-commerce web page forms contain an encrypted and encoded string, which contains basic information about a product for sale on the web page. Optional product data (e.g. size, color) is selected by an online shopper and transmitted with the basic information when the form is submitted to a cash register server. The form may also contain store ID information which is used to the look up the secret string needed to decrypt the product information. A method for generating the encrypted encoded string for use in the web page is described. Confidentiality is provided with regard to purchases over the Internet.

21 Claims, 12 Drawing Sheets

```
<HTML>
<HEAD>.....</HEAD>
<BODY>

...HTML Codes for descriptive text and referencing graphics, and multimedia content.

<A HREF="http://www.example.com/cgi-bin/example.cgi?vbc=displayable_vbc_string">
BUY NOW</A>

</BODY>
</HTML>
```

*FIG. 1*

```
<HTML>
<HEAD>.....</HEAD>
<BODY>

...HTML Codes for descriptive text and referencing graphics, and multimedia content.

<FORM ACTION="http://www.example.com/cgi-
biiiin/example.cgi?VBC=displayable_vbc_string" METHOD=GET>
<INPUT TYPE="RADIO" NAME="COLOR" VALUE="BLACK"CHECKED>BLACK
<INPUT TYPE="RADIO" NAME="COLOR" VALUE="GRAY">GRAY
<INPUT TYPE="RADIO" NAME="COLOR" VALUE="BLUE">BLUE
<INPUT TYPE="SUBMIT" NAME="SUBMIT" VALUE="BUY NOW!">
</FORM>
</BODY>
</HTML>
```

*FIG. 2*

```
<HTML>
<HEAD>.....</HEAD>
<BODY>

...HTML Codes for descriptive text and referencing graphics, and multimedia content.

<FORM ACTION="http://www.example.com/cgi-bin/example.cgi" METHOD=GET>
<SELECT NAME="SIZE">
<OPTION SELECTED>SMALL</OPTION>
<OPTION>MEDIUM</OPTION>
</SELECT>
<INPUT TYPE="HIDDEN" NAME="VBC" VALUE="displayable_vbc_string">
<INPUT TYPE="SUBMIT" NAME="SUBMIT" VALUE=BUY NOW!">

</FORM>
</BODY>
</HTML>
```

*FIG. 3*

METHOD AND APPARATUS FOR E-COMMERCE BY USING OPTIONAL FIELDS FOR VIRTUAL BAR CODES

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

This invention generally pertains to sending secure information between two parties, particularly this invention pertains to submitting information in a secure manner over the world wide web (WWW), more particularly this invention pertains to a manner in which product information in an E-commerce web page may be transmitted to a cash register server in an encrypted, and signed manner.

2. Description of the Prior Art

The present invention pertains to E-commerce. It specifically pertains to web pages used to present goods or services for sale over the Internet, and to accept orders for such goods or services interactively. It pertains more generally, to analogous uses, i.e., where a user is presented with a web page bearing some information, the web page being capable of accepting a response (e.g. a form), which will trigger some information from the web page to be transmitted to some destination on the Internet, and it is preferable to maintain the transmitted information confidential.

There has been a good deal of concern expressed over confidentiality of messages sent over the Internet. A message sent from one computer to another over the Internet may pass through other computers and network routers in route, in fact the exact path of the message is not predetermined, and may vary from one transmission between the two computers, to the next. The concern stems, in part from the fact that the messages go through numerous computers in the course of transmission, which increases the opportunity for illegal interception and/or alteration.

There is a need to maintain confidentiality in E-commerce for a number of reasons. Public users of the Internet have expressed concern about the security of the Internet as it pertains to submitting credit card information over the Internet when ordering goods. In response to this the Secure Socket Layer (SSL) method of security and encryption has been widely implemented. This method will preserve the security of any credit card information entered by the user but requires negotiation of keys and encryption and decryption for each transmission between the client and the server which requires processing by both the client and server computer and slows down the response to user inputs.

In an E-commerce transaction, it is also desirable to maintain confidentiality as to the identity of the product being purchased. The buyer=s desire for confidentiality may stems from privacy considerations. The seller may consider the number and type of purchases of specific items proprietary. It would be desirable to maintain confidentiality without the processing overhead of SSL method and the resulting time delay.

Preserving the security of an item ordered from a web page presents a different challenge to preserving the confidentiality of submitted credit card information. In the case of the credit card when the web page containing the form for accepting the credit card information is downloaded to the client computer the credit card information is not known. On the other hand when the web page that accepts a buy order for a product, for example, is downloaded to the client computer, the identity of the product that will be requested when the buy (form submit) button is activated is already known. Only some ancillary information, for example, size and color, is not known.

There are many Internet service providers (ISP) that are well equipped to host merchants web pages on the WWW, but are ill equipped and lack to expertise to handle business/financial transactions, e.g., order processing associated with an E-commerce web site.

What is needed is a system by which a WWW user can submit secure information received on a web page from a WWW server back to the WWW server, or to another WWW server addressed in the web page, without requiring the use of SSL or other in line encryption techniques. One specific case is that of shopping over the Internet, in which it is desirable to have a system in which an online shopper using the WWW can submit a request to purchase a product from a web page, and have that information remain confidential. It is also desirable to provide a system by which the online shopper or other user can specify ancillary information, and have that information submitted as well, along with the confidential information.

It would be desirable to provide an E-commerce methodology that allows an online shopping web page to be hosted by an ISP, and allows for processing of transaction from the shopping web page to be handled by a service specializing in providing business/financial services for E-commerce. The ISP may have a high-speed connection to the Internet but lack the hardware, software, and expertise for handling business/financial transactions.

It would be desirable to be able to present an online shopping web page to a WWW user that has a simple >clean=layout i.e., a set up selectable inputs such as radio buttons or pull down selection menus, and a single buy button, as opposed to a web page having a large array of individual buy buttons corresponding to a myriad of selection combinations (e.g. size and color of a garment).

It would be desirable to have such a one-buy button per product web page, which is compatible with encrypted basic product data, so that confidentiality is maintained as to the basic product data.

SUMMARY OF THE INVENTION

According to one aspect of the invention a method of making a web page containing secure information comprising the steps of: assembling a first concatenated string by concatenating, at least, one or more associated name value pairs, encrypting the first concatenated string to yield an encrypted string, encoding the encrypted string to produce a displayable character string, associating the displayable character string with a name, and placing the name and the displayable character string into an HTML source code.

According to another aspect of the invention a system and computer readable medium is disclosed for carrying out the above method.

BRIEF DESCRIPTION OF THE FIGURES

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

FIG. 1 is a HTML code fragment in which encrypted product information is embedded within an <A> tag.

FIG. 2 is a HTML code fragment having encrypted product information embedded within a <FORM> tag, and user selectable input generating code, in the form of radio buttons.

FIG. 3 is a HTML code fragment having encrypted product information embedded within a HIDDEN type <INPUT>, and user selectable input generating code, in the form of a select list.

DETAILED DESCRIPTION OF THE PREFERRED EMBODIMENTS

Figure 4:
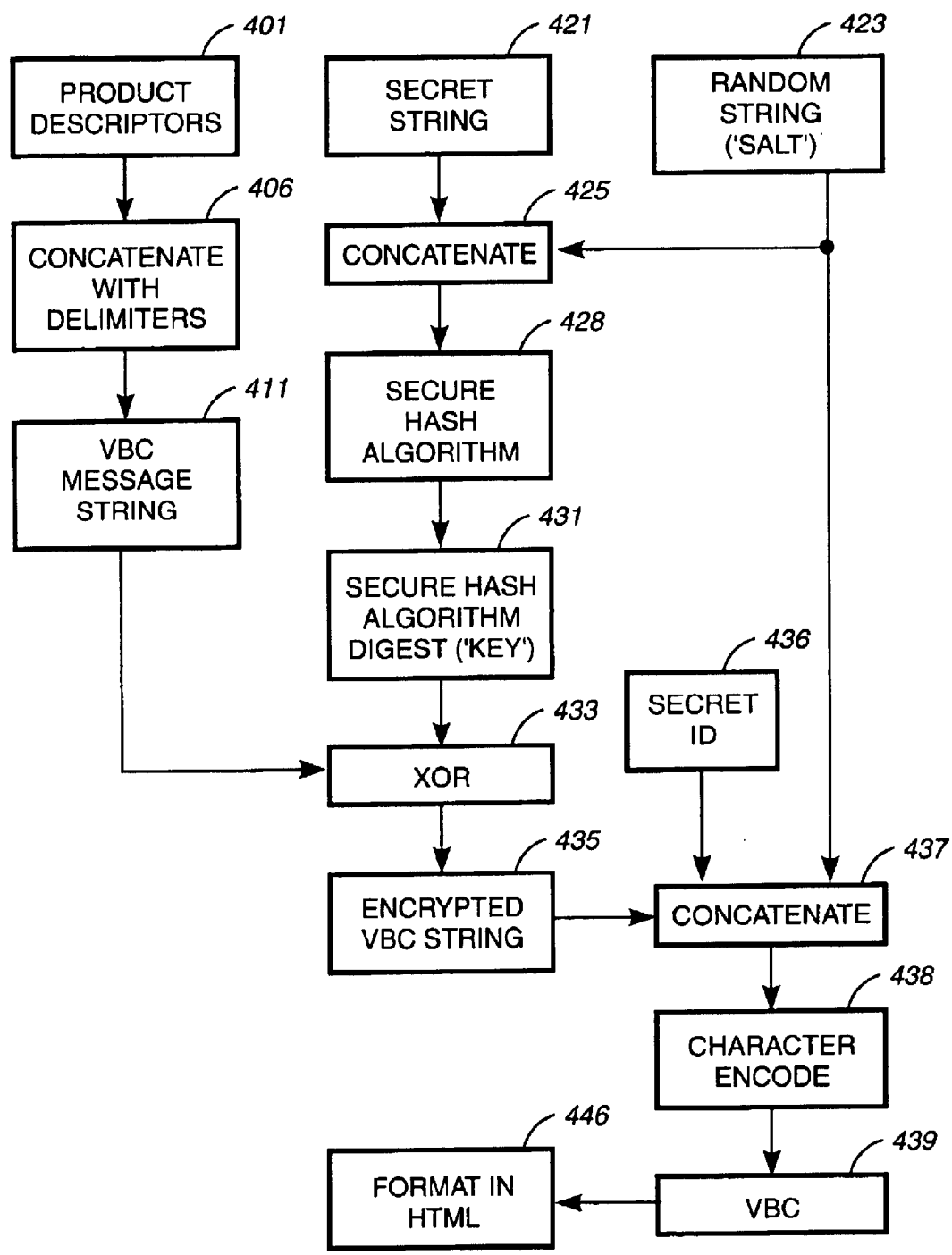
FIG. 4 is a flow diagram of an algorithm for producing a virtual bar code.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

According to one embodiment of the invention a merchants web page contains an encoded (displayable character), encrypted string containing information about a product that has been provided by a merchant. The information, which may be useful in inventory control, order fulfillment, or for other business related purposes, comprises basic product data arranged in field name value pairs. The field name designates the type of information and the value gives the information itself. The encoded encrypted string with other information attached, which is useful in decrypting the string is called a virtual bar code (VBC). According to one embodiment of the invention the VBC includes the following items of basic product information listed by field name:

vbc_id=<40 characters maximum> (generated value which identifies VBC)

prod_id=<20 characters maximum> (product ID)

price=<10 characters maximum> (represents floating point value)

desc=<1024 characters maximum> (product description)

vbc_create=<10 characters maximum> (representing date/time (long)) and may also contain sku=<20 characters maximum> (sku number)

wt=<20 characters maximum> (product weight)

wtm <20 characters maximum> (units of weight measurement)

ship=<20 characters maximum> (shipping data)

tax=<20 characters maximum> (tax data)

vbc_type=<20 characters maximum> vbc type expire=<10 characters maximum> (representing date/time (long) ).

The above items are merely exemplary. The set of basic product descriptors chosen depends on the needs of the merchant. Additional information used for encryption and decryption purposes, will be discussed below.

The field name value pairs are concatenated together to form one string. Following, for example, the conventions of Hypertext Transfer Protocol (HTTP), the standard for communication of Hypertext Markup Language (HTML) documents over the World Wide Web (WWW), the field name value pairs can be formatted with an equal sign within each pair separating the field name from the value, and an ampersand character separating each pair from the next so that, schematically, the concatenated string with the aforementioned delimiters will appear as follows:

Name1=Value1&Name2=Value2&Name3=Value3 . . .

The string of field name value pairs is then encrypted using a secret string, and according to specific embodiments, a random string which serves to make the encrypted string less susceptible to cryptanalysis. The random string and a secret ID, is correlated to the secret string and can be used by an authorized recipient as an index into a database in their possession. In another embodiment, the use of the secret string as an index to a database can also be appended or concatenated with the string of field name value pairs with appropriate delimiter characters if desired.

Strong, encryption algorithms work at the bit level, and the cipher they produce is a bit sequence not necessarily a character string, even though the input may have been a character string. The random string and possibly the secret ID, can also be binary sequences. HTML, and HTTP on the other hand call for the exchange of displayable character based codes, which are interpreted at a client computer. In order to include the concatenated binary stringing an HTML document is character encoded. One standard for character encoding is called Base64 encoding. Base64 encoding converts each consecutive group of six bits into a character specified in a table given by the standard.

The whole encoded string then comprises a VBC. The specific ancillary information included in the VBC, e.g. the random string, and secret ID, depends on the choice of encryption algorithm.

The displayable character string, random string, and secret ID can be entered separately into the web page code or preferably they can be concatenated together, optionally with appropriate delimiters interposed, e.g. a certain binary sequence, between them, and the whole concatenated string may be Base64 encoded.

According to online store embodiments, this displayable character string containing all the basic data on a product for sale over the Internet is then included in a section of a web page, which may contain text description, pictures, and other multimedia content pertaining to an item presented for sale. The displayable character string is included in the HTML source code in a manner such that it will be transmitted to a Universal Resource Locator (URL) target address specified in the web page. The inventors have determined alternative methods within the framework of the HTML and HTTP standards for accomplishing the inclusion of this encrypted product information.

In this specification HTML tokens are capitalized. HTML tags in particular, are shown within angular brackets < >, according to HTML syntax.

Referring to FIG. 1, an excerpted section of HTML code is shown. According to the alternative illustrated in FIG. 1, the displayable string bearing the numerous product descriptors as detailed above, is appended to a URL value of an HREF attribute of an <A> HTML tag, which points to a Common Gateway Interface (CGI) script which carries out the decoding and decrypting algorithm to be described below, or pre-processes the submitted data and calls a separate decoding and/or decrypting program. The HTML code, (shown in excerpted form, understood by persons of ordinary skill in the art) when interpreted by a client computer web browser (e.g. Netscape Navigator or Microsoft Internet Explorer) will cause the words ABUY NOW@ which are enclosed with the <A> type HTML tags to appear as a hypertext link. When the web surfer clicks on the ABUY NOW@ hypertext link. The contents of the opening <A> tag will be interpreted by the web browser to cause the web browser to send the displayable string to the CGi specified by the URL in the HREF attribute of the tag. The product information will be sent in encoded and encrypted form, so that the WWW user can be assured of the privacy of his purchasing activities.

Referring to FIG. 2, an alternative excerpted section of HTML code is shown. According to this alternative, the displayable string containing the encoded and encrypted product information is appended to a URL value of an ACTION attribute of an <FORM> HTML tag, which points to a Common Gateway Interface (CGI) script which executes and/or calls the decoding and decrypting algorithm to be described below. Form sections of HTML code enclosed within form tags <FORM>, </FORM> contain special codes, e.g. <INPUT>, <SELECT> that are used to create GUI devices by which a user can set the values of selectable options. In FIG. 2 a number of <INPUT> tags, having the TYPE attribute set to RADIO cause a GUI device known in the terminology of HTML as a set of radio buttons to appear. Radio buttons give a set of option, only one of which may be selected. Each <INPUT> tag in a set has the same name attribute, e.g. color, and a different VALUE attribute e.g. blue, gray. Each radio button is presented adjacent corresponding text e.g. >Blue=, >Gray=. The user using a pointing device, e.g. a mouse, can click on one of the set of radio buttons in order to set the value of the selectable option, having the name given by common NAME attribute to a desired value e.g., blue. An <INPUT> tag having the TYPE attribute set to SUBMIT is also included in the form section. The SUBMIT type <INPUT> tag will cause a GUI device in the form of a button to appear within the display area of the web browser. The user activating this device e.g. by clicking on it with the mouse will cause data within the form to be transmitted to the URL address specified in the ACTION attribute of the opening <FORM> tag along with the displayable string bearing the product information. According to the HTTP standard, since the METHOD attribute of the opening form tag is set to GET, the name value pair of the selected radio button e.g. color=blue will be concatenated with an ampersand separator character to the displayable string and its name VBC yielding a string of the following exemplary form: vbc=displayable_string&color=blue and will be, according to the HTTP standard stored an environment variable named QUERY_STRING, which may be accessed by the CGI script at the target URL. If the POST METHOD had been used the displayable string would still be sent in the QUERY_STRING, but the selected name value pair would have been sent in another HTTP programming construct called STDIN (stands for standard input).

The initial parsing of the data in the case the GET METHOD or in case of the POST METHOD where multiple selected optional data are sent, can be accomplished by scripts known to persons of ordinary skill in the art of WWW programming.

Referring to FIG. 3, yet another excerpted, an exemplary section of HTML code is shown. In this case the displayable string is the VALUE attribute of and <INPUT> tag having a HIDDEN TYPE attribute and VBC as the name attribute. The <INPUT> tag is within a form section of the HTML code. Also within the form section is a set of <SELECT> tags enclosing a number of sets of <OPTION> tags which are interpreted by the web browser to cause a GUI device, specifically a select list, to be displayed in the display area of the web browser. The <SELECT> tag has a name attribute which gives the name of the selectable option e.g. size, and sets of <OPTION> tags enclose alternative options. The user may click on an option in the displayed select list to cause the data value of the selectable option corresponding to the value of the name attribute to be set. Also included within the <FORM> tags is an <INPUT> tag have a TYPE attribute of SUBMIT, which when interpreted by the web browser will cause a user actuable GUI device in the form of a submit button to be displayed in the display area of the web browser. When this device is actuated e.g. by clicking on it with the mouse pointer, the web browser transmits displayable string and its name VBC, as well as the value of the selected option along with the corresponding value of the name attribute. If the METHOD attribute of the opening <FORM> tag is set to GET then the transmitted data, including the displayable string, its name e.g. VBC, and the name and values of the selected options, will be arranged in name value pairs, and concatenated together with appropriate delimiter characters e.g. and equal sign separating each name from its corresponding value, and ampersand between pairs. The concatenated string will be set to the environment variable QUERY_STRING specified by the HTTP standard. The METHOD attribute could also be set to POST as discussed above in connection with FIG. 2.

Note that space is also indicated in the excerpted sections of code above, where text describing a saleable item, or HTML code references to images or other multimedia material related to the saleable item e.g. video, audio may be placed for advertising, legal compliance or other reasons.

Although not used in FIGS. 1–3, a CHECKBOX TYPE <INPUT> HTML tag could also be used to generate a GUI to accept user input.

If the random string and secret ID used in the encryption had not been concatenated with the sets of field name value pairs giving the basic product information, then they could be included in the form separately, for example within <INPUT> tags having the TYPE attribute set to HIDDEN.

Referring to FIG. 4 a flow diagram of an algorithm for producing a virtual bar code for inclusion in a web page is shown. In block 401, product descriptive information is obtained. The data may be, for example, imported from a database, collected by a CGI script which processes another web page form into which the merchant enters the data, or collected via a special program which embodies the algorithm to be described, and includes a (GUI) used to collect the data from a merchant.

In block 406, the information is concatenated, preferably with the same delimiter specified by the HTTP standard, that is with an equal sign between each field name and value, and an ampersand separating field name value pairs. Block 411 designates the VBC message string produced by block 406. In block 421, a secret string used in encrypting the VBC message is input to the algorithm. This secret string, preferably a binary sequence, is also known by the ultimate recipient of the VBC e.g. the addressee designated in the CGI URL to which the VBC is sent after the user actuates the GUI device to transmit his buy order or other WWW message.

In block 423 a random string, e.g., a binary random number, is input. The random string is also known as a salt. The random string, may be generated by a variety of random or pseudorandom number generators known in the programming art. At step 425, the secret string is concatenated with the random string. In block 428 a key generating secure hash algorithm is applied to the concatenated secret string and random string. A secure hash algorithm is an algorithm that accepts a variable length input string, and outputs a fixed length string produced therefrom. There are a variety of such algorithms also known as message digest algorithms which work similarly and could also be used for block 428 and for the signature secure hash algorithm to be discussed below. The nature of a secure hash algorithm is such that even knowing the algorithm, it is extremely difficult to determine the input string given the output string termed a >secure hash algorithm digest=(SHAD). Block 431 is the SHAD output by block 428. In block 433 the SHAD, 431 is used as an encryption key by sequentially XORing (exclusive or Boolean logic operation) it with consecutive segments of the VBC message string, to produce an encrypted VBC string, 435. Note that key is expected to be short relative to the VBC message string and thus the key must be XORed multiple times with consecutive segments of the VBC message string in order to produce a cipher (encrypted message). The XOR operation takes place at the bit level. In block 436 a secret ID is provided. The secret ID correlates to the secret string provided in block 421, which was used in conjunction with the random string to form the encryption key. The correlation is known to the ultimate recipient of the encrypted VBC string (e.g. the party controlling the URL to which the VBC is sent in response to a WWW user activating the submission directing GUI device). The ultimate recipient upon receiving the VBC along with the secret ID can then determine the secret string based on the correlation information in his possession, e.g. a database. The secret ID, random string, and encrypted VBC string are then concatenated in block 437. In block 438 the concatenated string is character encoded, e.g., by Base 64 encoding, to form the virtual bar code. Base64 encoding has the advantage that the resulting character string is made up of character common to ASCII, EBCDIC and other character sets used by computers around the world through which HTTP messages may be routed. The VBC 439 is a secure message, which ensures the privacy of the transmission between the WWW user e.g. online shopper and the ultimate recipient e.g. WWW store cash register server. In block 446, the VBC is included within a formatted HTML source code, such as shown in excerpted exemplary form in FIGS. 1–3. As discussed above in connection with FIGS. 1–3 the VBC may be included in the HTML code in a variety of ways.

The HTML source code is loaded onto a WWW server, and a WWW user, using a web browser client can direct the HTML source code to be downloaded to his client computer. The HTML source code is then interpreted by the client web browser to display various multimedia information, e.g., related to a product, and optionally to generate GUI devices for accepting user inputs to set the values of a set of selectable options, and to generate a user actuable submission directing GUI device, e.g. a ABUY@ button, in response to the actuation of which, the web browser will transmit the VBC containing one or more product descriptors, the secret ID, and the random string, along with the names and values of the selected options, to a server designated in a target URL in the HTML source code. The VBC and optional selection name value pairs will be received at the computer designated by the target URL, and parsed to separate the optional selection name value pairs and the VBC. It is then necessary to decode, and decrypt the VBC in order to extract the basic product data name value pairs, e.g. product ID, price, etc.

Figure 5:
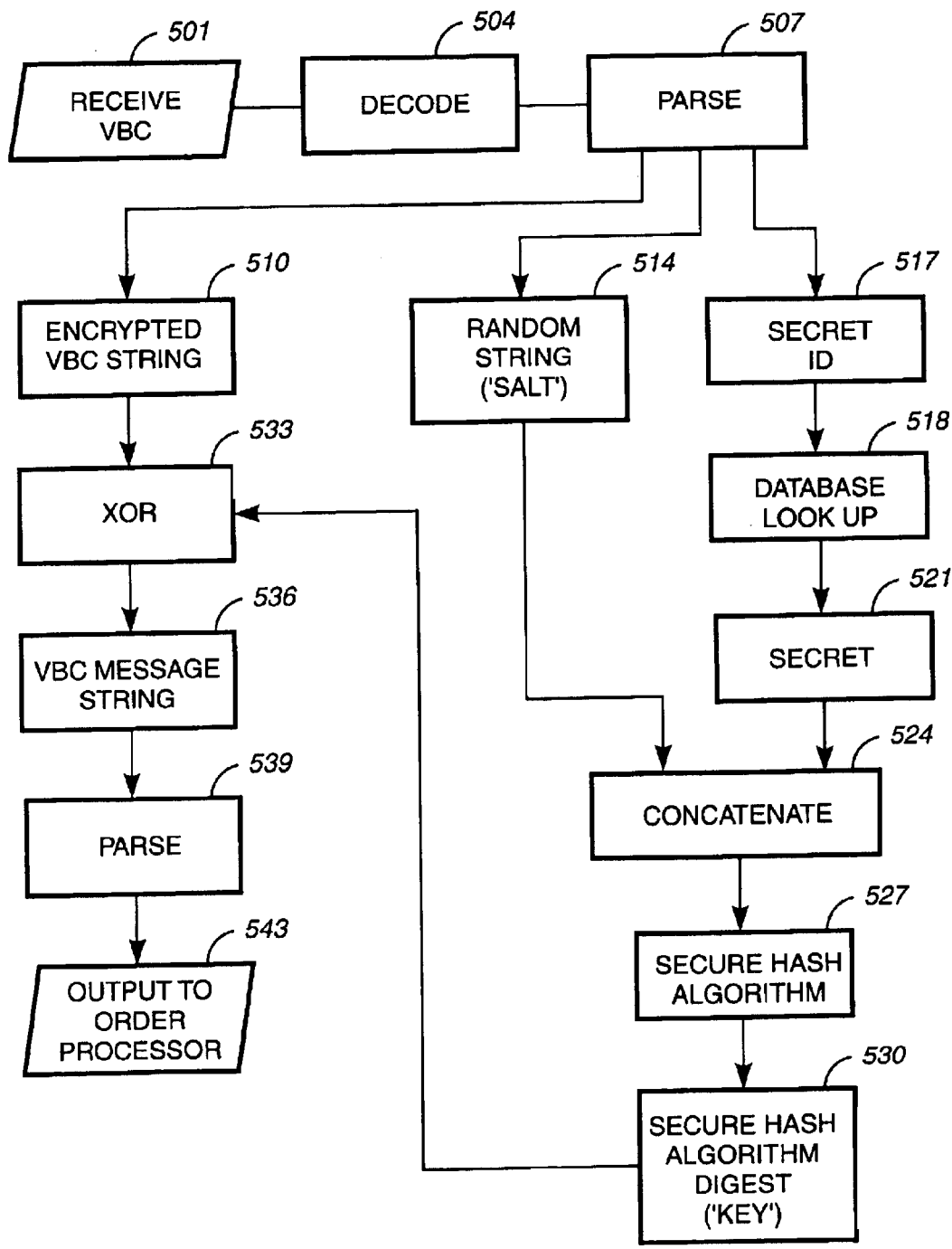
FIG. 5 is a flow diagram of an algorithm for decoding and decrypting a virtual bar code.

Referring to FIG. 5 a decoding and decryption algorithm for processing the received VBC encrypted and encoded as shown in FIG. 4, is shown in flow diagram form. Block 501 is the VBC input. In block 504 the VBC is decoded (e.g., base64 decoded) and in block 507 to resulting string is parsed to obtain encrypted VBC string, 510, random strings 514, and the secret ID 517. The secret ID, 517 is used as an index in a database of secrets strings in step 518, to find the secret string 521 which was used to encrypt the VBC. In block 524, the secret string 521 is concatenated with the random string 514, and the same key generating secure hash algorithm is used in block 527 to regenerate the SHAD (key), 530. The key, 530 is sequentially XORed in block 533 with consecutive segments of the encrypted VBC string, 510 to decrypt it and recreate the VBC message string, 536 (corresponding to 411 in FIG. 4). The VBC message string is then be parsed in block 539 to separate the name value pairs and the name value pairs are sent to an order processing block 543. The order processing block, the details of which are outside of the scope of the invention may for example comprise a WWW based shopping cart server side application which initiates a SSL connection to the users web browser, presents a listing of purchased items to the user, and presents a form for the submission of payment e.g. credit card information. Order processing may also, comprise such back end applications as inventory and shipping functions.

Figure 6:
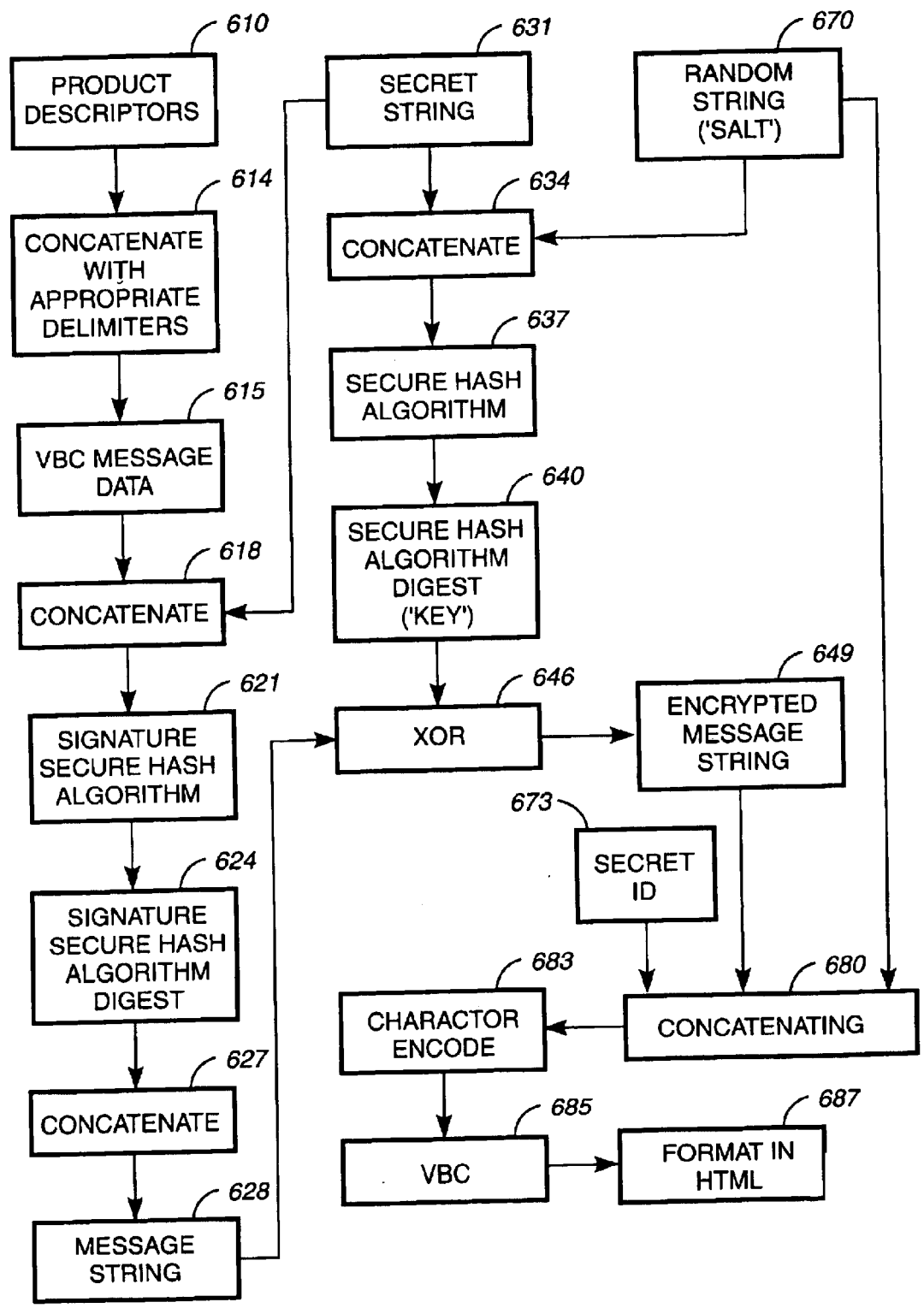
FIG. 6 is a flow diagram of an algorithm for producing a signed, encrypted, and encoded VBC.

Referring to FIG. 6, a flow diagram of an algorithm for generating a signed, encrypted and encoded VBC is shown. Field name value pairs of product descriptors are provided in block 610. In block 614 the field name value pairs are concatenated with appropriate delimiters to produce the VBC message data 615 string. A secret string is provided in block 631. The secret string is concatenated with VBC message data in block 618. The resulting concatenated string is supplied as input to a signature secure hash algorithm in block 621. The secure hash algorithm generates a signature SHAD 624. The signature SHAD is used to authenticate the VBC message data at the ultimate destination. The signature SHAD is then concatenated with the VBC message data in block 627, to produce a message string, 628 (secret-name value string).

A random string is provided in block 670. The secret string and the random string are concatenated in block 634, and the concatenated string is supplied as input to a key generating secure hash algorithm in block 637, which produces a key SHAD, 640.

The key SHAD, used as an encryption key, 640 is then XORed with the message string, 628 in block 646 to produce an encrypted message string, 649. A secret ID 673, is supplied and is concatenated in block 680 with the random string, 670, and the encrypted message string, 649. The concatenated string is character encoded, preferably, Base64 encoded in block 683, and the resulting VBC, 685 is then formatted in an HTML document, in block 687 as discussed above.

Figure 7:
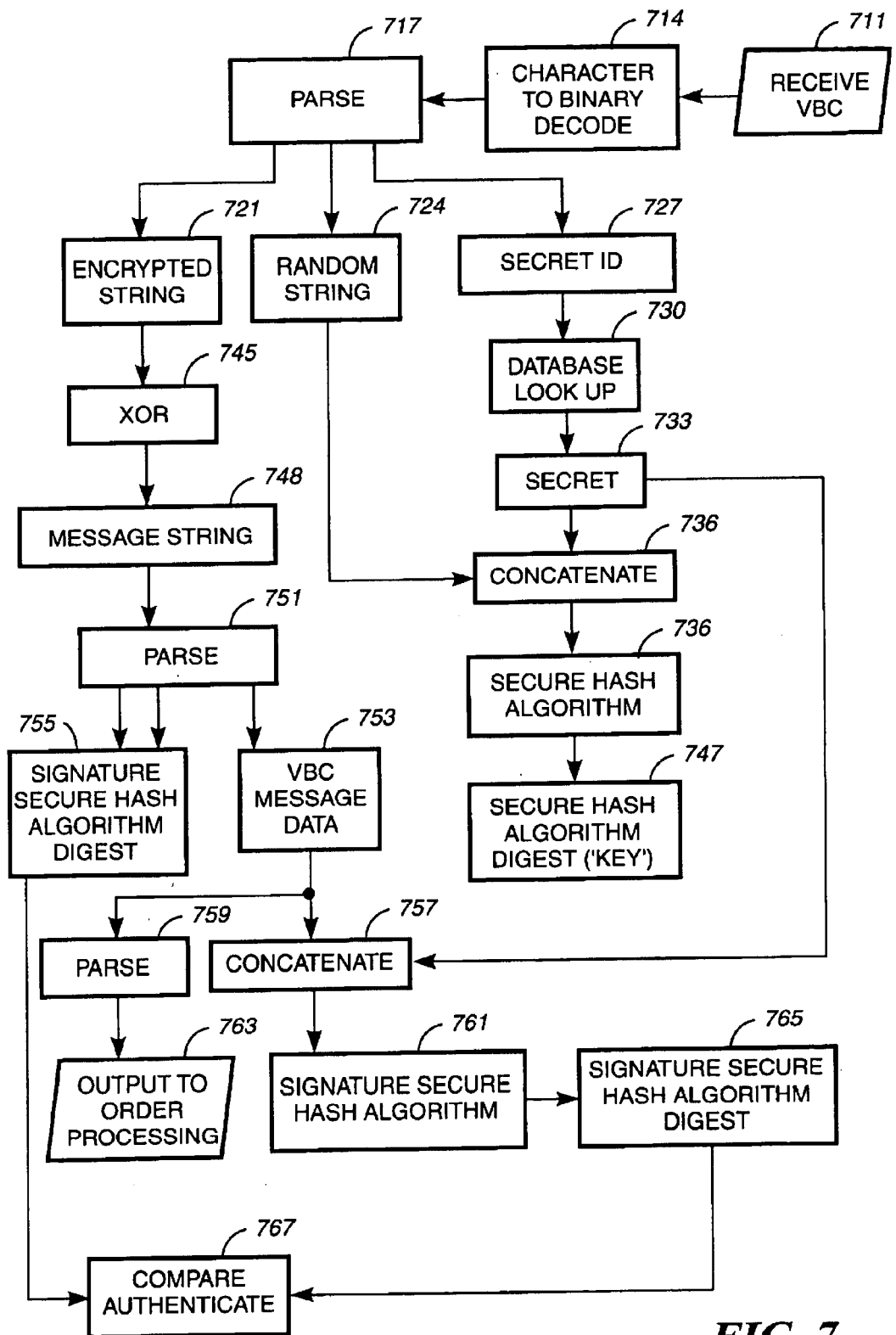
FIG. 7 is a flow diagram of an algorithm for decoding, decrypting, and authenticating a VBC.

Referring to FIG. 7 an algorithm for decoding, decrypting, and authenticating the VBC produced by the algorithm of FIG. 6 is represented. In block 711 VBC is received after being parsed from a received HTTP message, which may include selected option name value pairs. In block 714, the received VBC is decoded (e.g., base 64 decoded) to produce a binary string from received character string, and in block 717 the binary string is parsed to separate the encrypted string, 721, the random sting, 724, and the secret ID 727. The secret ID is used as an index into a database in block 730 to access the corresponding secret string, 733. The secret string, 733 is concatenated in block 736 with the random string, 724. The result is supplied to a key generating secure hash algorithm in block 739, which produces a SHAD 742 (identical to 640 in FIG. 6), which is used as the decryption key. The decryption key is then XORed in block 745 with the encrypted string, yielding the message string 748. The message string is then parsed in block 751, to separate the signature SHAD, 755 (624 in FIG. 6) and the VBC message data, 753. The VBC message data is then parsed by block 759 and output to an order processing block, 763. In order to authenticate the VBC message data, to assure that it has not been tampered with or otherwise corrupted in route from the client to the target URL, for the purpose of security, the following steps are executed. The VBC message data 753 is concatenated with the secret string 733 in block 757 and the concatenated string is supplied to a signature secure hash algorithm 761 which is identical to that indicated in FIG. 6 as 624, to reproduce a signature SHAD 765. The signature SHAD 755 parsed from the message string 748 is then compared in block 767 to the signature SHAD 765 reproduced by signature secure hash algorithm 761 to assure that they are identical. Without knowing the secret string it would be impossible for an unlawful third party to duplicate a signature SHAD 755 which matches the signature SHAD 765 created by the recipient=s signature secure hash algorithm 761 using the secret string.

If the signature is not authenticated a message can be sent to the order processing block 763 to halt the order processing.

As presently contemplated the random string, the secret string and the signature SHAD contemplated to be 20 bytes long binary sequences, and the key SHAD is contemplated to be 16 bytes. However the length of these strings is expected to increase in the future, in order to maintain resistance to cryptanalysis attacks in the face of increasing computer power.

U.S. export regulations, and laws of many countries, set limits on the length of the key used in encryption in software products. To meet these restrictions, the inventors have sought to provide a modification of the VBC encryption and decryption algorithms for use with the invention that use a shorter length key than the length of the output of the message digest algorithm used. The length of the digest produced by the secure hash algorithm discussed in connection with FIGS. 4–7 is 16 bytes or 128 bits.

Figure 8:
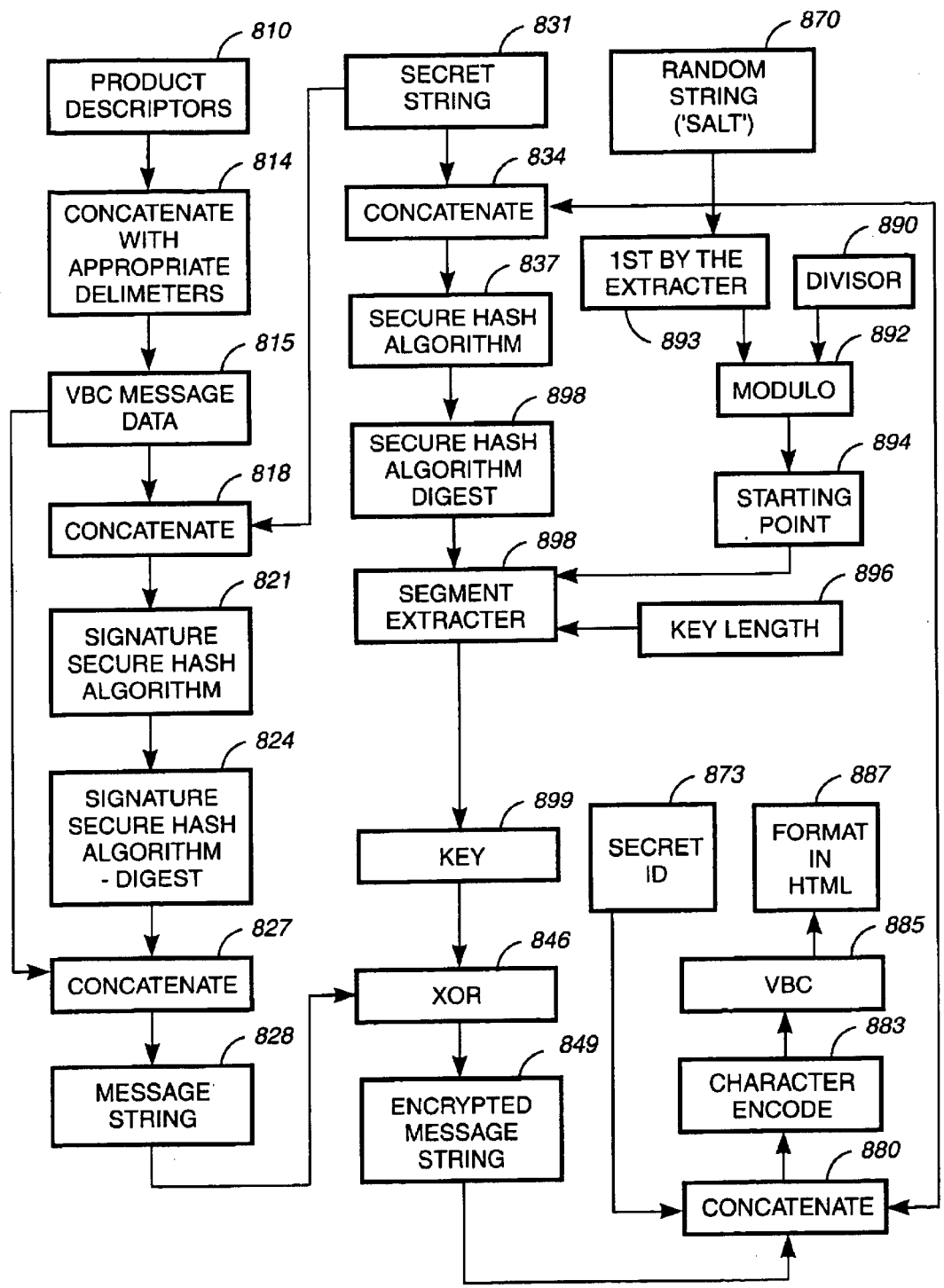
FIG. 8 is a flow diagram of an algorithm for producing a signed and encrypted VBC using a lower bit length encryption key.

FIG. 8 is a flow diagram of an algorithm for producing a signed, encrypted, and encoded VBC using a reduced length encryption key. The algorithm shares many of the same functional blocks, and sequences of functional blocks with that shown in FIG. 6. Blocks in FIG. 6 and FIG. 8 which have the same purpose are indicated with reference numerals having the last two digits in common. Reference is made to description above given in connection with FIG. 6, for an explanation of these Blocks.

In FIG. 8, a new set of functional blocks, which extract a segment of the SHAD, 891 to be used as a lower bit encryption key will now be described. Block 891 is a SHAD produced by secure hash algorithm 837 (637 in FIG. 6). In order to select a segment of the secure hash algorithm 837, the random string is supplied to a first byte extraction block 893, a divisor, (e.g. 16' in the case of a 16 byte SHAD, 891) is supplied in block 890, the first byte of the random string, and the divisor, are applied to a modulo block 892 which extracts the remainder after dividing the first byte of the random string by the divisor. The remainder, a number between zero and fifteen is taken as an index to indicate a byte number starting point, 894 in SHAD 891. A key length, which depends on the level of security desired, and must also comport with the laws of the countries in which the VBC is used, is supplied in block 896. The key length may be for example 40 bits to meet the legal requirements in France. The key length and the starting point are input to a segment extractor, 898 which extracts a key segment, 899 from the message digest algorithm starting at the starting point and ending at the starting point plus the key length. If the starting point, 894 and key length, 896 are such that the extractor would overrun the end of the SHAD, the extractor extracts a sequence of bits terminating at the end of the SHAD and then continues extracting at the beginning of the SHAD to obtain the number of bits specified key length. The reduced size key is used in the same manner as the full key SHAD 640 was used in the scheme depicted in FIG. 6, that is, it is XORed in block 846 with the message string, 828.

Figure 9A:
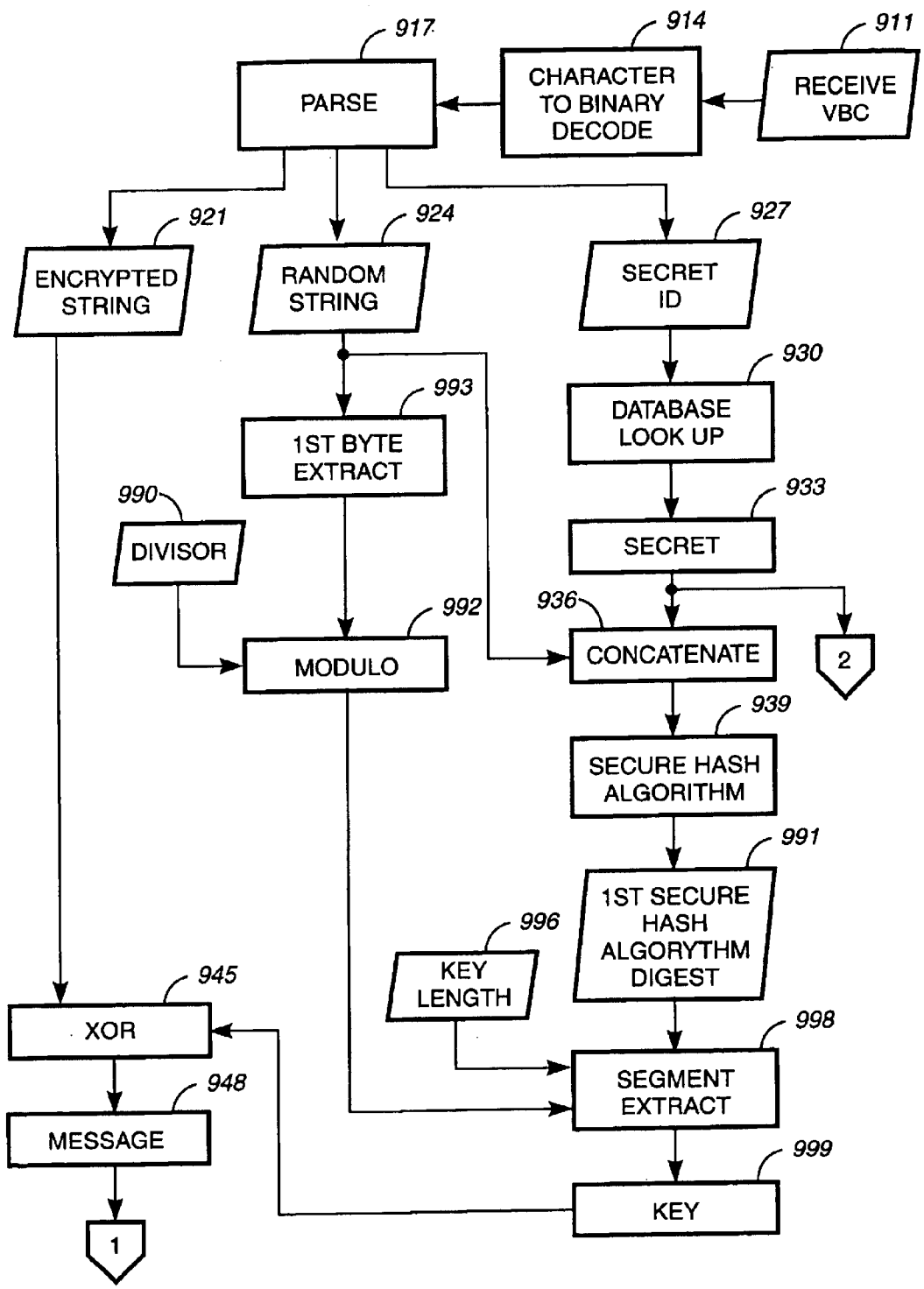
FIG. 9A is a flow diagram of the beginning of an algorithm for decoding, decrypting, and authenticating, a VBC produced using algorithm represented in FIG. 8
Figure 9B:
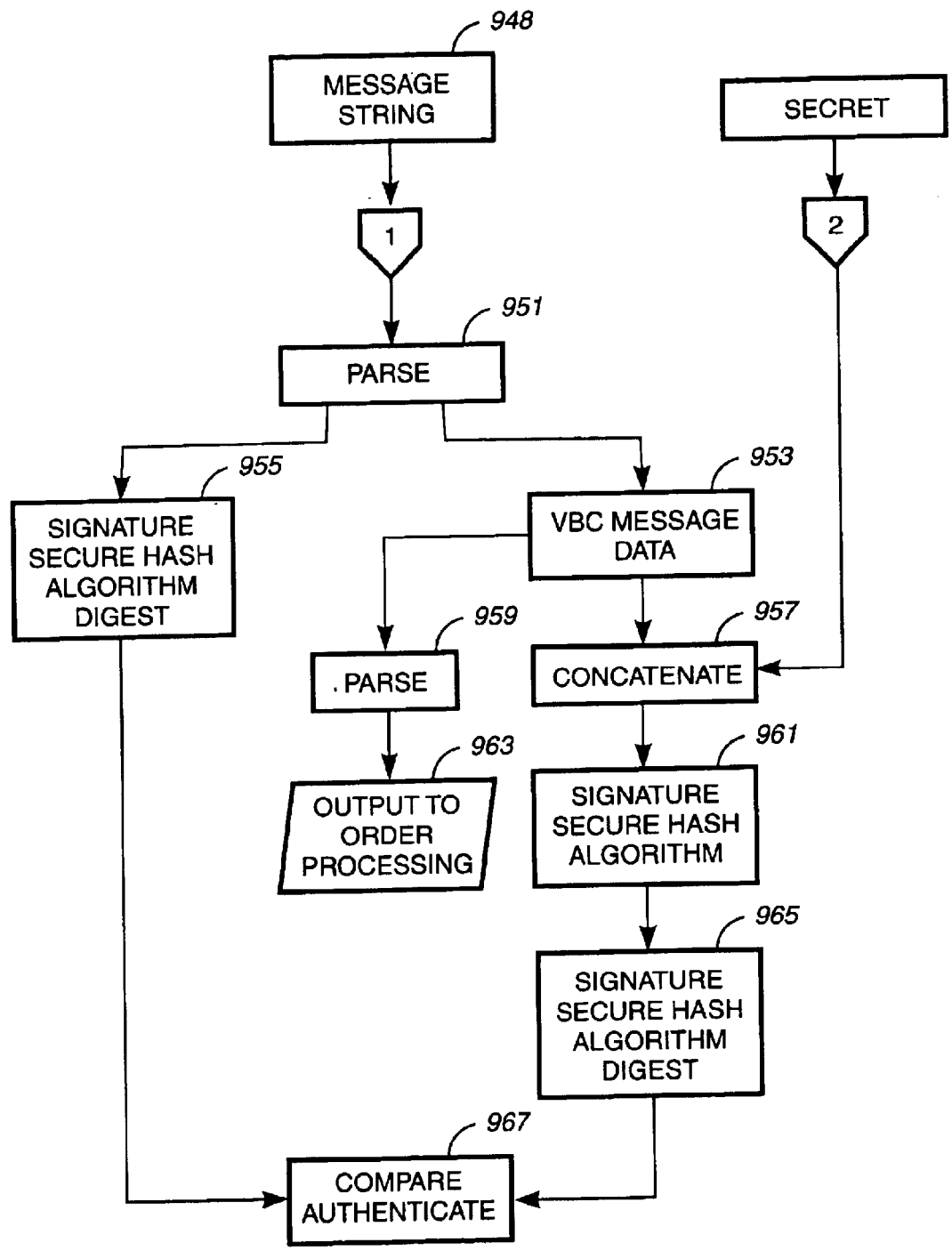
FIG. 9B is a flow diagram of the ending of an algorithm for decoding, decrypting, and authenticating, a VBC produced using algorithm represented in FIG. 8

FIG. 9A and FIG. 9B show a flow diagram for decoding and decrypting a received VBC generated according to the flow diagram of FIG. 8. This flow diagram shares many blocks and functional block relationships with the FIG. 7. Functional blocks in FIG. 7 and FIG. 9 having the same purpose have the last two numbers of the reference numerals in common. Reference, is made to the description given above in connection with FIG. 7 for an explanation of those blocks in FIG. 9 having a common purpose with blocks in FIG. 7.

Referring to FIGS. 9A, 9B, the first byte of the random string 924, is extracted in block 993. A divisor, 990, the same as was used in the encryption algorithm, is provided. The first byte of the random sting 924 from the extractor 993 and the divisor are input to a modulo block 992, which supplies a remainder to a segment extractor 998. The remainder, a number between zero and fifteen, is taken to a starting point. A key length 996, the same as was used in the encryption (e.g. 40 bits), is also supplied to the segment extractor 998. The segment extractor also receives the 128 bit (16 byte) SHAD 991 as input and outputs a key, 999, starting at the byte indicated by the remainder, and having a bit length given by the key length input, 996. The case of segment extractor overrunning the end of the SHAD is handled as discussed in connection with the encryption described in connection with FIG. 8. The key is used to decrypt the encrypted string by an XOR operation. The reference is again made to the description given in connection with FIG. 7 for an explanation of the workings of the remaining portion of the algorithm.

Figure 10:
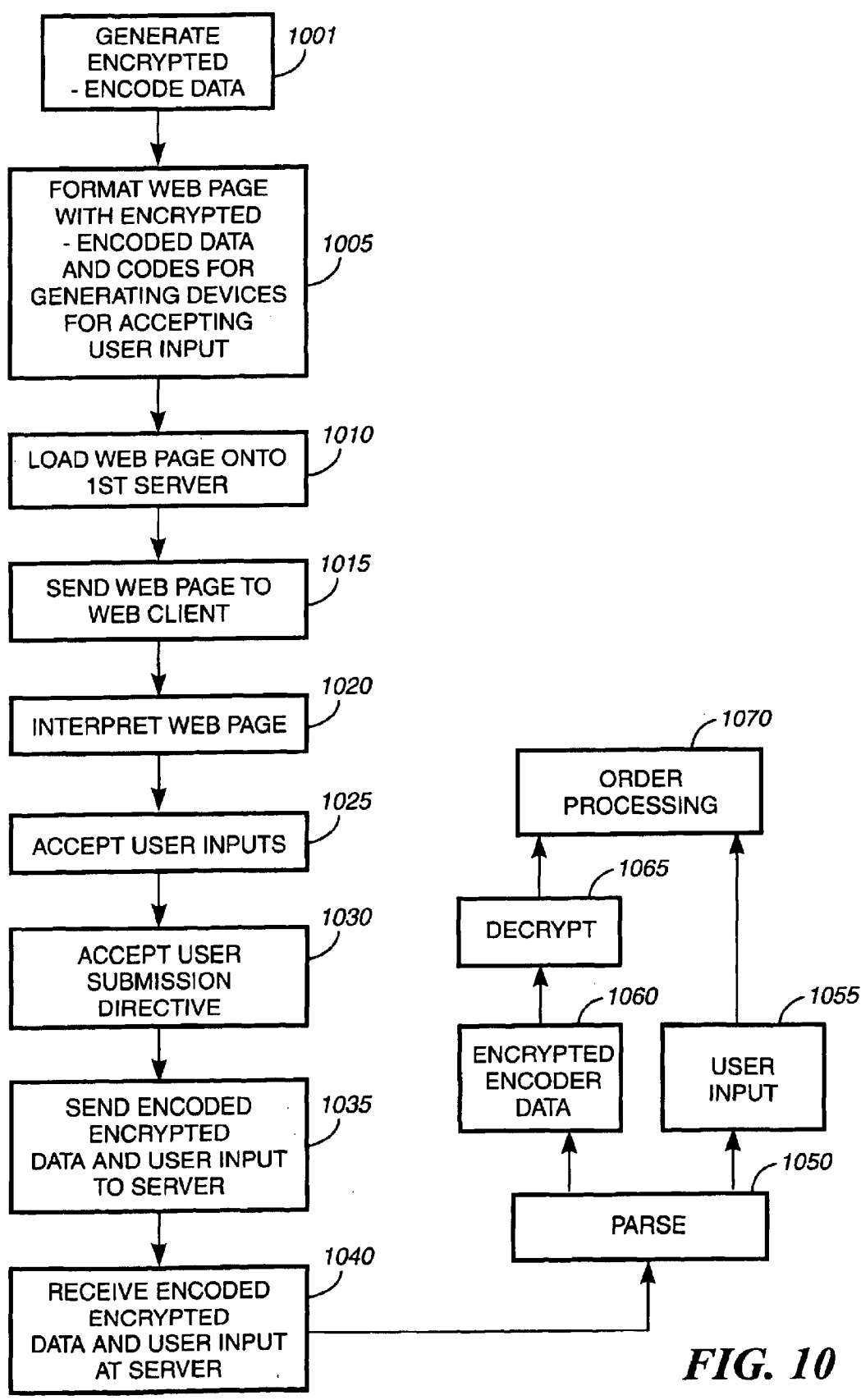
FIG. 10 is a high level flow diagram depicting an embodiment of the invention

Referring to FIG. 10, an overall process flow according to an embodiment of the invention is shown and will presently be described. In block 1001 the encrypted encoded data is generated. In the case of an online shopping application the encrypted encoded data may be a VBC. The VBC generation may use the algorithms discussed in connection with FIGS. 4, 6, and 8, the output is a character encoded (displayable) string. In block 1005 the encrypted encoded data is formatted into a web page for example, as shown in FIGS. 1–3. The web page also contains codes to generate web page devices, e.g., GUI devices for accepting user input, for example, the radio button, and select lists shown in FIG. 2 and FIG. 3, respectively, and a submission directive accepting GUI. In block 1010 the web page is loaded onto a first server. In the case of online shopping application of the invention, the first server may be termed a store front server. In block 1015 the web page is sent to a WWW client. The WWW client may be in the form of a web browser running on a client computer connected to the Internet, and the web page may be sent in response to a web navigation input (e.g. clicking on a link to the page) by a user operating the client computer. In block 1020, the web page is interpreted by the WWW client, e.g., the web browser. GUI devices are generated based on the web page code, for accepting user input, and accepting a submission directive. In block 1025 user inputs are accepted by the client computer based on the devices generated in block 1020. In block 1030, a user submission directive is accepted (e.g., the user clicks on a submit button). In response to the submission directive the encoded encrypted data generated in block 1001, and data based on the user inputs in block 1025, are sent to a server in block 1035. The data is received in block 1040. The server receiving the data in block 1040, may be the same server onto which the web page was loaded in block 1010, or it may be a different server. In the case of an online shopping application the two servers are preferably distinct. This would allow for the computing/business arrangement in which the WWW store front is hosted by one Internet service provider (ISP) which would load the web page onto its server in step 1010, and whose service is convenient to the store owner, and the purchase transaction processing is handled by a specialized financial/business service provider, which would receive the data in block 1040 and process the purchase transaction. In step 1050, the received data is parsed to separate the user input data 1055, from the encrypted encoded data 1060. In the case of a HTML web page as discussed above, in connection with FIG. 2 if the encrypted encoded data is included appended to the URL specified in the ACTION attribute of the <FORM> tag and the POST METHOD is used then the encoded encrypted data will be communicated per HTTP in separate variables then the user input data, so they will not need to be separated by parsing. In block 1065 the encrypted encoded data is decrypted. The decryption may follow the algorithms discussed in connection with FIGS. 5, 7, 9A, 9B. In block 1070 the decrypted data and the user input data is received for order processing.

Figure 11:
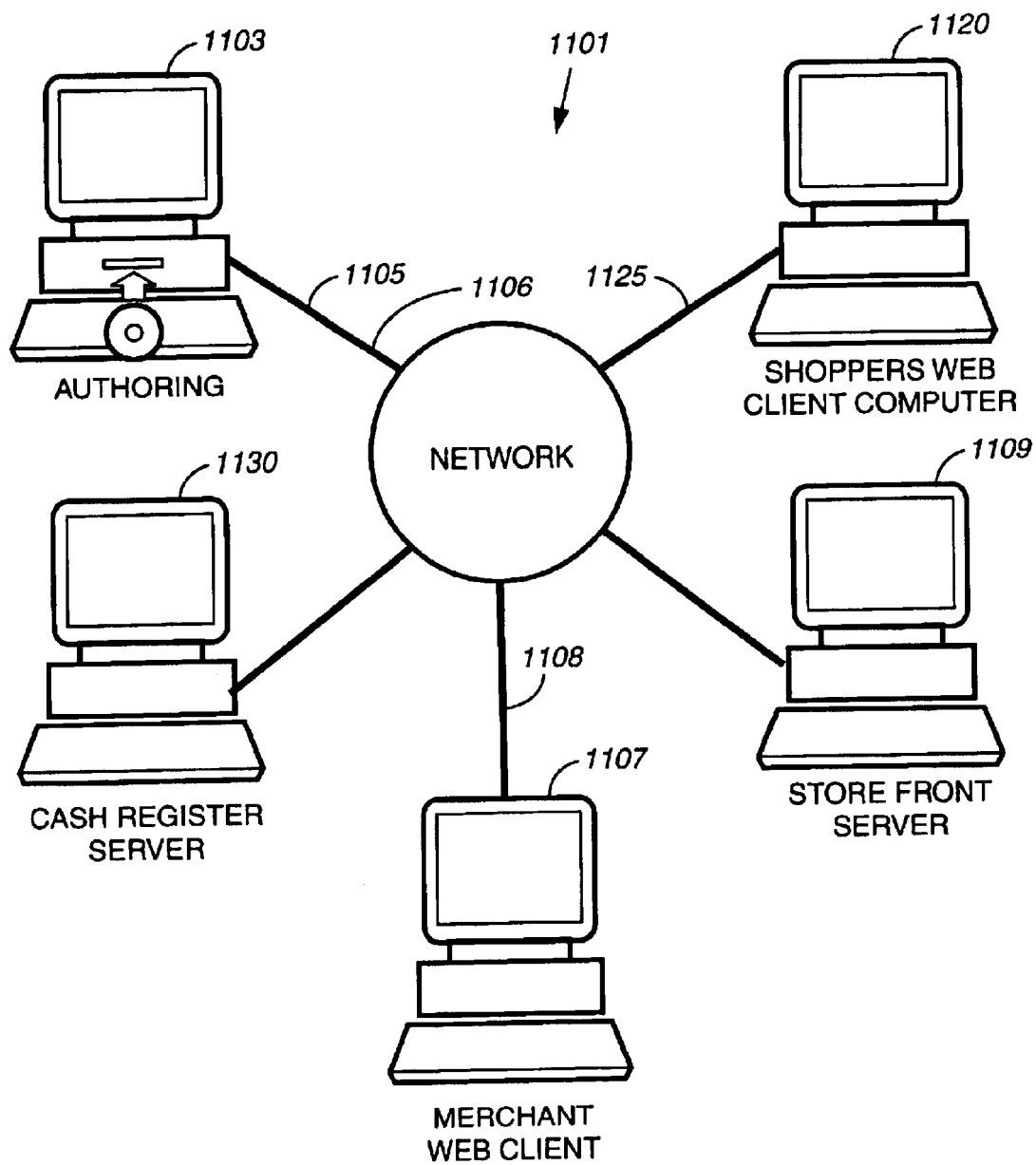
FIG. 11 is a schematic representation of a network according to an embodiment of the invention.

Referring to FIG. 11, a computer network 1101 according to an embodiment of the invention is shown. The network may be for example, the Internet, an Intranet. An authoring computer 1103, is connected to the network over link 1105, and execute an algorithm for encrypting, and encoding one or more items of data, e.g. in the case of on line shopping a VBC, according to the flow diagrams shown in FIGS. 4, 6, 8. The authoring computer may be connected to the network through a communications link 1106, for example a digital subscriber line (DSL), modem connection, Ethernet, etc. The authoring computer may take the form of a standard PC computer, comprising BIOS ROM, RAM, hard drives, keyboard, mouse, display screen, and a removable media drive 1140. The removable media drive may be used to load authoring software embodying the encryption and encoding algorithm onto the authoring computer, from memory medium on which it is recorded. The authoring software then configures the computer to execute the encryption and encoding algorithm. The removable media 1141 may be for example an optical disk (e.g., CDROM), a magnetic media disk (e.g. 3.5"1.44 Meg Disk). The authoring software may have an interactive input for the user to enter basic product information for building the VBC, or that information may be retrieved, based on user input, from a database on the authoring computer, 1103 or from a database on another computer accessed over the network. In fact the user may use the authoring computer, 1103 from a remote location via the network, e.g. from a merchant WWW client computer 1107, in which case the authoring software may be operated through a WWW based interface (e.g., web browser) communicating with a CGI run on the authoring computer. The merchant WWW client computer may also take the form of a PC computer as described above, with a link 1108 to the network. The authoring software may be integrated into a user friendly web page composing application, or it may be a stand-alone utility, which simply displays the encrypted encoded VBC in a window from which the user may paste it into a text editor or other application with which web page code is being composed. The functionality could be split e.g. the web page composing function could be accomplished on the merchant WWW client, and the generation of the VBC could be a server side application on the authoring computer accessed from the merchant WWW client. The merchant could then download the VBC from the authoring computer 1103 for inclusion in the web page. The two computers could communicate using encryption e.g. SSL to ensure the privacy of basic product data sent to the authoring computer 1103 for use in generating the VBC.

When the merchants' web page is completed it is uploaded, through the network to a store front server computer 1109. The store front server computer 1109 can be a computer operated by an ISP convenient to the merchant, having a high-speed connection e.g. T1 line connection to the network in order to handle a high volume of WWW traffic. The store front server may be a somewhat higher powered computer running the UNIX operating system, that is better able to handle a high volume network traffic.

An online shopper uses a shopper WWW client computer 1120 connected by a communication link 1125, for example modem, cable modem, or DSL line to the network. The online shopper WWW client computer is loaded with some network communication software preferably a web browser. The web browser is used to navigate to the merchants web page, e.g., by clicking on a link, resulting in the merchants web page code, having embedded therein the VBC being transferred to the shopper web client computer 1120, and interpreted by the web browser. The interpreted web page code configures the shoppers web client computer, to display information relative to one or more products, and optionally to display GUI devices for accepting user selections. The web page code includes code for generating a GUI device, which references a destination address (e.g., URL) on the network, which when actuated by the user causes the VBC and any user selection data to be transmitted to the destination. The latter, may comprise an <A> TML tag with the VBC appended to the URL specified in the HREF attribute, (FIG. 1), or it may comprises an HTML form with the VBC either appended to the URL specified in the ACTION attribute of the <FORM> tag (FIG. 2), or enclosed within HIDDEN TYPE <INPUT> tag (FIG. 3).

The specified destination (URL) is preferably a cash register server computer, 1130 which is separate from the store front server, so that it can be a specialized computer used to provide business/financial services, e.g., order processing. The cash register server computer 1130 is loaded with software capable of decoding and decrypting the encrypted and encoded data, e.g., the VBC, The software may for example embody the algorithms described with reference to FIGS. 5, 7, 9A, 9B. The cash register server receives the information transmitted from the shoppers WWW client computer 1120, parses the information, and decodes and decrypts the VBC. The cash register server may also handle further order processing functions, e.g., billing, shipping, which are beyond the scope of the present invention.

The system in FIG. 11 may be implemented by combination of hardware and software. Moreover, the functionality required for using the invention may be embodied in computer-readable media (such as 3.5 inch diskette to be used in programming an information-processing apparatus (e.g., a personal computer) to perform in accordance with the invention. Computer program means or computer program in the present context means any expression, in any language, code or notation, of set of instructions intended to cause a system having an information processing capability to perform a particular function either directly or after either or both of the following: a) conversions to another language, code or notation; b) reproduction in a different material form.

Although the application of the invention to online shopping has been discussed with reference to the figures, the invention should not be construed as limited thereto. It will be understood by those having skill in the art that changes can be made to this specific embodiment without departing from the spirit and scope of the invention. The web page need not be a page related to a saleable item, and the encrypted, encoded data need not be information related to a product. The scope of the invention is not to be restricted, therefore, to the specific embodiment, and it is intended that the appended claims cover any and all such applications, modifications, and embodiments within the scope of the present invention.

What is claimed is:

1. A communication method comprising steps of:
   concatenating a plurality of descriptors to form a first string;
   encrypting the first string to form an encrypted string;
   encoding at least the encrypted string to create a displayable string;
   entering the displayable string into a form section of a web page code, the form section having a reference to a target URL address;
   entering one or more selectable option codes into the form section;
   entering a submission directing code into the form section;
   loading the web page code onto a first server computer;
   transferring the web page code from the first server computer to a client computer in response to a request entered in a web browser on the client computer by a user;
   loading the web page code into the web browser and interpreting the web page code;
   setting a set of values of selectable options in response to one or more user input actions by the user activating one or more graphical user interface devices generated from the selectable option codes;
   transmitting the displayable string and the set of values of selectable options to the target URL address in response to the user interacting with a graphical user interface device generated from the submission directing code.

2. The communication method of 1 wherein the step of encoding at least the encrypted string to create a displayable string further comprises:
   concatenating a secret ID with the encrypted string to produce a second string; and
   encoding the second string.

3. The communication method of claim 1, wherein the step of concatenating at least a plurality of descriptors to form a first string comprises:
   concatenating the plurality of descriptors and a secret string to produce a descriptor-secret string;
   applying a signature secure hash algorithm digest to the descriptor-secret string to produce a first signature; and
   concatenating the first signature with the plurality of descriptors to produce the first string.

4. The communication method of claim 3 further comprising:
   parsing the first string on the second server to separate the first signature from the plurality of descriptors;
   concatenating the secret string with the plurality of descriptors to produce the descriptor-secret string on the second server;
   applying the signature secure hash algorithm to the descriptor-secret string to produce a second signature on the second server; and
   comparing the first signature to the second signature;
   whereby the authenticity of the encrypted string can be determined.

5. The communication method of claim 1, wherein the encrypting step comprises:
   providing a secret string;
   providing a random string;
   concatenating the secret string and the random string;
   creating a key secure hash algorithm digest from the concatenated random string and secret string;
   extracting a key segment from the key secure hash algorithm digest; and
   XORing the key segment with a message string comprising at least the first string to produce the encrypted string.

6. The communication method of claim 5 further comprising:
   providing a secret ID associated with the secret string;
   transmitting the secret ID, and the random string in response to the user actuating the graphical user interface device generated from the submission directing code;
   receiving the displayable string, the set of values of selectable options, the secret ID, and the random string at a second server corresponding to the target URL;

decoding one or more of the secret ID, random string, and the encrypted string;

using the secret ID as an index into a database of secrets to select therefrom the secret associated with the secret ID;

recreating the key secure hash algorithm digest on the second server;

XORing the segment of the key secure hash algorithm digest with the encrypted string to recreate the first string is recreated on the second server.

7. The communication method of claim 5, wherein the step of extracting a key segment from the key secure hash algorithm digest comprises sub steps of:

extracting a segment of the random string;

dividing the segment of the random string by a divisor to produce a remainder;

using the remainder as an index to indicate a starting position of the key segment in the key secure hash algorithm digest;

providing a length variable;

adding the length variable to a starting position to obtain an ending position of the key segment in the key secure hash algorithm digest; and extracting a key segment starting at the starting position and end at the ending position from the key secure hash algorithm digest.

8. A computer readable medium containing programming instructions for making a web page cipher comprising programming instructions for concatenating a plurality of descriptors to form a first string;

encrypting the first string to form an encrypted string;

encoding at least the encrypted string to create a displayable string;

entering the displayable string into a form section of a web page code, the form section having a reference to a target URL address;

entering one or more selectable option codes into the form section;

entering a submission directing code into the form section;

loading the web page code onto a first server computer;

transferring the web page code from the first server computer to a client computer in response to a request entered in a web browser on the client computer by a user;

loading the web page code into the web browser and interpreting the web page code;

setting a set of values of selectable options in response to one or more user input actions by the user activating one or more graphical user interface devices generated from the selectable option codes;

transmitting the displayable string and the set of values of selectable options to the target URL address in response to the user interacting with a graphical user interface device generated from the submission directing code.

9. The computer readable medium according to claim 8, wherein the programming instruction for encoding at least the encrypted string to create a displayable string further comprises:

concatenating a secret ID with the encrypted string to produce a second string; and encoding the second string.

10. The computer readable medium according to claim 8, wherein the programming instruction for concatenating at least a plurality of descriptors to form a first string further comprises:

concatenating the plurality of descriptors and a secret string to produce a descriptor-secret string;

applying a signature secure hash algorithm digest to the descriptor-secret string to produce a first signature; and concatenating the first signature with the plurality of descriptors to produce the first string.

11. The computer readable medium according to claim 10, wherein the programming instruction comprises:

parsing the first string on the second server to separate the first signature from the plurality of descriptors;

concatenating the secret string with the plurality of descriptors to produce the descriptor-secret string on the second server;

applying the signature secure hash algorithm to the descriptor-secret string to produce a second signature on the second server; and comparing the first signature to the second signature;

whereby the authenticity of the encrypted string can be determined.

12. The computer readable medium according to claim 8, wherein the programming instruction for encrypting step further comprises:

providing a secret string;

providing a random string;

concatenating the secret string and the random string;

creating a key secure hash algorithm digest from the concatenated random string and secret string;

extracting a key segment from the key secure hash algorithm digest; and

XORing the key segment with a message string comprising at least the first string to produce the encrypted string.

13. The computer readable medium according to claim 12, further comprising:

providing a secret ID associated with the secret string;

transmitting the secret ID, and the random string in response to the user actuating the graphical user interface device generated from the submission directing code;

receiving the displayable string, the set of values of selectable options, the secret ID, and the random string at a second server corresponding to the target URL;

decoding one or more of the secret ID, random string, and the encrypted string;

using the secret ID as an index into a database of secrets to select therefrom the secret associated with the secret ID;

recreating the key secure hash algorithm digest on the second server;

XORing the segment of the key secure hash algorithm digest with the encrypted string to recreate the first string is recreated on the second server.

14. The communication method of claim 12, wherein the step of extracting a key segment from the key secure hash algorithm digest comprises sub steps of:

extracting a segment of the random string;

dividing the segment of the random string by a divisor to produce a remainder;

using the remainder as an index to indicate a starting position of the key segment in the key secure hash algorithm digest;

providing a length variable;

adding the length variable to a starting position to obtain an ending position of the key segment in the key secure hash algorithm digest; and extracting a key segment starting at the starting position and end at the ending position from the key secure hash algorithm digest.

15. A system for making a web page containing secure information comprising:

means for concatenating a plurality of descriptors to form a first string;

means for encrypting the first string to form an encrypted string;

means for encoding at least the encrypted string to create a displayable string;

means for entering the displayable string into a form section of a web page code, the form section having a reference to a target URL address;

means for entering one or more selectable option codes into the form section;

means for entering a submission directing code into the form section;

means for loading the web page code onto a first server computer;

means for transferring the web page code from the first server computer to a client computer in response to a request entered in a web browser on the client computer by a user;

means for loading the web page code into the web browser and interpreting the web page code;

means for setting a set of values of selectable options in response to one or more user input actions by the user activating one or more graphical user interface devices generated from the selectable option codes;

means for transmitting the displayable string and the set of values of selectable options to the target URL address in response to the user interacting with a graphical user interface device generated from the submission directing code.

16. The system according to claim 15, wherein the means for encoding at least the encrypted string to create a displayable string further comprises:

means for concatenating a secret ID with the encrypted string to produce a second string; and means for encoding the second string.

17. The system according to claim 15, wherein the means for concatenating at least a plurality of descriptors to form a first string further comprises:

means for concatenating the plurality of descriptors and a secret string to produce a descriptor-secret string;

means for applying a signature secure hash algorithm digest to the descriptor-secret string to produce a first signature; and means for concatenating the first signature with the plurality of descriptors to produce the first string.

18. The system according to claim 17, further comprising:

means for parsing the first string on the second server to separate the first signature from the plurality of descriptors;

means for concatenating the secret string with the plurality of descriptors to produce the descriptor-secret string on the second server;

means for applying the signature secure hash algorithm to the descriptor-secret string to produce a second signature on the second server; and means for comparing the first signature to the second signature;

whereby the authenticity of the encrypted string can be determined.

19. The system according to claim 15, wherein the means for encrypting step further comprises:

means for providing a secret string;

means for providing a random string;

means for concatenating the secret string and the random string;

means for creating a key secure hash algorithm digest from the concatenated random string and secret string;

means for extracting a key segment from the key secure hash algorithm digest; and means for XORing the key segment with a message string comprising at least the first string to produce the encrypted string.

20. The system according to claim 19, further comprising:

means for providing a secret ID associated with the secret string;

means for transmitting the secret ID, and the random string in response to the user actuating the graphical user interface device generated from the submission directing code;

means for receiving the displayable string, the set of values of selectable options, the secret ID, and the random string at a second server corresponding to the target URL;

means for decoding one or more of the secret ID, random string, and the encrypted string;

means for using the secret ID as an index into a database of secrets to select therefrom the secret associated with the secret ID;

recreating the key secure hash algorithm digest on the second server;

means for XORing the segment of the key secure hash algorithm digest with the encrypted string to recreate the first string is recreated on the second server.

21. The system according to claim 19, wherein the means for extracting a key segment from the key secure hash algorithm digest further comprises:

means for extracting a segment of the random string;

means for dividing the segment of the random string by a divisor to produce a remainder;

means for using the remainder as an index to indicate a starting position of the key segment in the key secure hash algorithm digest;

means for providing a length variable;

means for adding the length variable to a starting position to obtain an ending position of the key segment in the key secure hash algorithm digest; and means for extracting a key segment starting at the starting position and end at the ending position from the key secure hash algorithm digest.

* * * * *